United States Patent [19]
Miller et al.

[11] 3,913,324
[45] Oct. 21, 1975

[54] FLOW-SENSING SWITCH FOR BACKUP STEERING SYSTEM

[75] Inventors: Wayne Russel Miller, Dubuque; Robert James Lucke, Jr., Bellevue, both of Iowa

[73] Assignee: Deere & Company, Moline, Ill.

[22] Filed: Mar. 10, 1975

[21] Appl. No.: 556,733

Related U.S. Application Data

[62] Division of Ser. No. 465,836, May 1, 1974, Pat. No. 3,890,995.

[52] U.S. Cl. ............ 60/405; 60/DIG. 2; 180/79.2 R
[51] Int. Cl.² ......................................... F15B 20/00
[58] Field of Search ........ 60/403, 404, 405, DIG. 2; 180/79.2 R, 82 R

[56] References Cited
UNITED STATES PATENTS

| | | | |
|---|---|---|---|
| 2,396,984 | 3/1946 | Broadston et al. | 60/404 |
| 3,791,775 | 2/1974 | Bochnak et al. | 60/405 X |
| 3,800,900 | 4/1974 | Goodale | 60/405 X |

*Primary Examiner*—Edgar W. Geoghegan

[57] ABSTRACT

Disclosed is a vehicle power steering system including a flow-sensing switch for energizing an electrohydraulic safety backup system for supplying fluid pressure to the steering motor of the vehicle when a main pump becomes inoperative to supply pressure fluid to the steering motor. The flow-sensing switch is in the form of a poppet valve including a valve element which is normally seated to complete an electrical circuit for energizing an electric motor for driving an auxiliary pump. The poppet valve element is held open by fluid pressure delivered by the main pump when the main pump is working properly. The output of the auxiliary pump is connected to the poppet valve element such that the fluid pressure delivered by the auxiliary pump aids in maintaining the poppet valve element in its closed position.

5 Claims, 2 Drawing Figures

3,913,324

FLOW-SENSING SWITCH FOR BACKUP STEERING SYSTEM

This is a division of application Ser. No. 465,836, filed May 1, 1974, now U.S. Pat. No. 3,890,995, granted June 24, 1975.

BACKGROUND OF THE INVENTION

The present invention relates to a vehicle power steering system and more particularly relates to a flow-sensing valve which acts as a switch to energize an electrohydraulic backup system in the event that the main power steering pump becomes inoperative.

The flow-sensing valve of the present invention is that which is illustrated schematically in U.S. application Ser. No. 345,906 filed by Miller et al on Mar. 29 1973.

Current devices used to perform an electrical switching function similar to the valve of the present invention require dynamic seals to seal moving parts which protrude outside the devices and provide more opportunity for fluid leaks, and involve more complex and therefore expensive and unreliable systems for sensing flow. Additionally, these current devices which form valving and electrical switching functions usually include separate components for accomplishing each of the functions.

SUMMARY OF THE INVENTION

According to the present invention, there is provided a vehicle power steering system including an auxiliary pump driven through means of an electric motor, and more particularly, there is provided an improved flow-sensing valve which also acts as a switch for energizing an electrical circuit for controlling the operation of the electric motor.

A broad object of the invention is to provide a flow-sensing valve of simple construction which will perform a switching function to effect actuation of an auxiliary steering system in the event that the main pump for the primary system fails to operate properly. More specifically, it is an object of the invention to provide a flow-sensing valve, of the type just described, which includes a poppet valve element which is normally closed against a valve seat and wherein the valve seat and poppet valve element form parts of an electrical switch.

A further object of the invention is to provide a flow-sensing valve which serves also as a flow-sensing switch and wherein the components involved in the switching function require only a single static seal to prevent leakage of hydraulic fluid from the valve.

A further object of the invention is to provide a flow-sensing valve, as just described, wherein the output of the auxiliary pump is connected to the flow-sensing valve so as to aid in keeping the poppet valve element seated to thus prevent any possibility of the poppet valve element from bouncing off its seat to thereby de-energize the electric motor of the auxiliary system.

These and other objects will be apparent from the following description read in conjunction with the appended drawing.

DESCRIPTION OF THE PREFERRED EMBODIMENT

Figure 1:
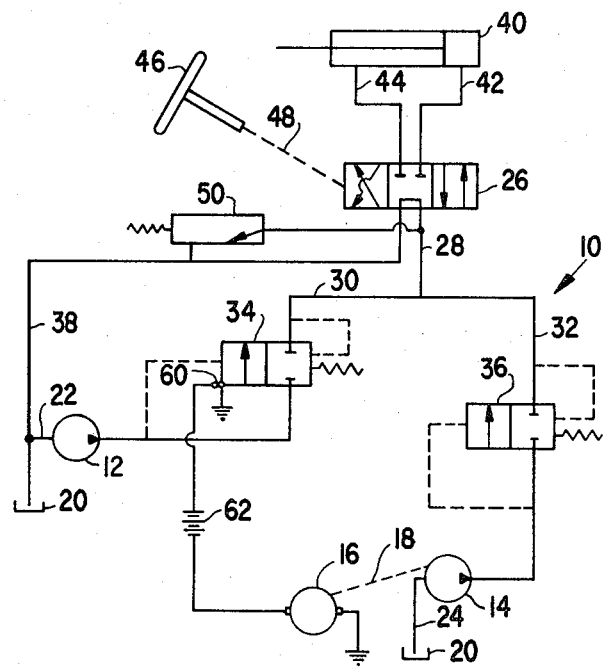
FIG. 1 is a combined schematic electric and hydraulic circuit diagram of an electrohydraulic vehicle power steering system including a flow-sensing valve constructed in accordance with the present invention to act as a switch.

Referring to FIG. 1 of the drawing, therein is shown a main and backup hydraulic power steering system indicated in its entirety by the reference numeral 10. The steering system 10 includes fixed displacement main and auxiliary pumps 12 and 14, respectively, the main pump being driven directly from the vehicle engine (not shown) in a manner conventional in the art and the auxiliary pump 14 being driven by an electric pump motor 16 drivingly connected to the auxiliary pump through conventional means (not shown) indicated here by the dashed line 18. While it is preferable that the auxiliary pump 14 be driven by a power source other than the vehicle engine, the pump may be driven by any electrically responsive drive means without departing from the principles of the invention. For example, an electromagnetic clutch could be used to engage a drive coupling between an output shaft of the vehicle transmission and the pump 14. The main and auxiliary pumps 12 and 14 have inlets connected to a reservoir 20 through means of suction conduits 22 and 24, respectively. The main and auxiliary pumps 12 and 14 respectively have outlets connected to an inlet port of a steering control valve 26 through means of a feed conduit 28 having a first branch 30 connected to the outlet of the main pump and having a second branch 32 connected to the outlet of the auxiliary pump. Located in the first and second conduit branches 30 and 32 are flow-sensing valves 34 and 36, respectively, which act as one-way valves for allowing flow only in the direction of the control valve 26 from the main and auxiliary pumps 12 and 14. The control valve 26 also includes an exhaust port, which is connected to the reservoir 20 through means of a return conduit 38 and includes a pair of supply ports respectively connected to the opposite ports of a reversible steering motor 40 through means of supply conduits 42 and 44. The control valve 26 is here shown as a three-position, four-way, open-center valve positioned in a centered, neutral position wherein fluid is blocked in the opposite work ports of the steering motor 40 and the feed conduit 28 is connected to the reservoir 20. The steering wheel 46 is operatively connected to the control valve 26 in a conventional manner (not shown) indicated here by the dashed line 48 and by which turning of the steering wheel in a first direction effects rightward lifting of the control valve to connect the right- and lefthand work ports of the steering motor respectively to the return and feed conduits 28 and 38, and by which turning of the steering wheel 46 in the opposite direction effects leftward shifting of the control valve to connect the right- and left-hand work ports of the steering motor respectively to the feed and supply conduits. A relief valve 50 is located in the feed conduit 28 and is operative to connect the conduit 28 to the reservoir when a predetermined maximum pressure is built up in the conduit 28.

The flow-sensing valve 34 acts as a switch and this function is schematically represented by a pair of normally closed contacts represented schematically at 60. The contacts 60 separate to open a circuit including a battery 62 connected to the electric motor 16. The electrical circuit for operating the motor 16 has been simplified from the circuitry actually used for the sake of brevity and reference may be had to the above-mentioned co-pending application Ser. No. 345,906 for the remainder of the circuitry.

Figure 2:
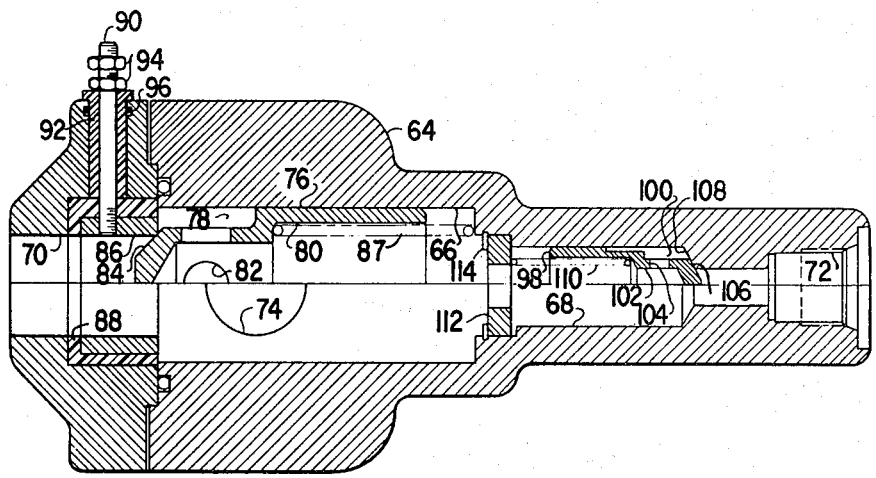
FIG. 2 is a longitudinal sectional view showing the flowsensing valve of the present invention.

Referring now to FIG. 2, it can be seen that the flow-sensing valves 34 and 36 are located in a common valve body 64 in which is located a valve bore including a large bore section 66 located leftwardly of a small bore section 68. Respectively leading into the left and right ends of the bore are inlet ports 70 and 72 which are respectively connected to the outlets of the main and hydraulic pumps 12 and 14, respectively. Extending through the valve body 64 and intersecting the large bore section 66 is an outlet port 74. The flow of fluid from the left inlet port 70 to the outlet port 74 occurs by way of the flow-sensing valve 34 which includes a poppet valve element 76 mounted for shifting axially in the large bore section 66. The left end portion of the valve element 76 is stepped radially inwardly from the wall of the bore section 66 so as to define an annular space 78 which is connected in fluid communication with a hollow interior 80 of the valve element 76 through means of a plurality of orifices 82. The left end of the valve element 76 is closed and defines an annular seating surface 84 normally held in engagement with the right end of a ring-like valve seat 86 through means of a coil compression spring 87 having its opposite ends respectively engaged with a shoulder at the right end of the large bore section 66 and a shoulder of the valve element 76 located in the hollow interior 80. It is here to be noted that the valve element 76 together with the valve body 64 form one of the separable contacts shown at 60 in FIG. 1 while the valve seat 86 forms the other contact. For the purpose of insulating the valve seat 86 from the valve body 64, the valve seat 86 is molded in a housing 88 made of an electrical insulating material such as nylon or the like. The valve seat 86 is connected to the electrical circuit through means of a metal rod 90 which projects through the valve body 64 and is threaded into the valve seat 86. The metal rod 90 is molded in a generally cylindrical housing 92 made of an electrical insulating material such as nylon so that the rod 90 is insulated from the valve body 64. A pair of nuts 94 are located on a threaded upper end of the rod 90 for the purpose of securing an electrical lead thereto. For the purpose of preventing fluid from leaking from the valve bore to the exterior of the valve body fixed along a path at the exterior of the housing 92, there is provided a static seal 96 which surrounds the housing 92.

Thus, it will be appreciated that when the main pump 12 is operating properly, pressure fluid from the outlet thereof will unseat the poppet valve element 76 so as to permit fluid to flow to the outlet port 74 by way of the annular space 78. Further, it will be appreciated that if the pressure delivered by the pump 12 is insufficient to properly operate the steering motor 40, the poppet valve element 76 will be seated and a circuit will be completed to the electric motor 16 for operating the auxiliary pump 14.

Flow from the auxiliary pump must pass through the flowsensing valve 36 on its way to the steering valve 26. Thus, the flow-sensing valve 36 includes a poppet valve element 98 which is axially shiftably mounted in the small bore section 68. The poppet valve element 98 has a right end portion which is stepped away from the wall of the bore section 68 and cooperates therewith to form an annular space 100. The annular space 100 is connected in fluid communication with a hollow interior portion 102 of the valve element 98 through means of a plurality of orifices 104. The right end of the valve element 98 is closed and forms a seating surface 106 which is normally engaged with a valve seat 108, formed at the right end of the bore section 68, through means of a coil compression spring 110 having its opposite ends respectively engaged with a washer-like member 112 and a shoulder located in the hollow interior portion 102 of the valve element 98. The washer-like member 112 is kept from shifting leftwardly through means of a snap ring 114.

Thus, it will be appreciated that when the auxiliary pump 14 is in operation, the fluid from the outlet thereof will unseat the valve element 98 so as to permit fluid to flow through the outlet port 74 by way of the annular space 100, the orifices 104 of the valve element 98, the hollow interior 80 and orifices 82 of the valve element 76. It is to be noted that when fluid is flowing in the inlet port 72, the valve element 76 will be closed and the incoming fluid will aid the spring 87 in maintaining the element 76 closed so as to prevent the valve element 76 from becoming unseated so as to disconnect the flow of electrical current to the electric motor 16.

The operation of the flow-sensing valve 34 and the steering system 10 is thought to be clear from the foregoing description and no further discussion is given for the sake of brevity.

We claim:

1. In a vehicle having a main power steering system including a main pump fluid connected to a fluid-operated steering motor by means including a steering valve, an auxiliary pump fluid connected to the steering motor by means including the steering valve, an electrically responsive drive means being connected to and energizable for driving the auxiliary pump, and electrical circuit means connected to said drive means and including fluid condition responsive switch means connected to the output of said main pump and being operative for connecting a source of electrical energy to said drive means in response to the fluid at the output of the main pump being inadequate for operating the steering motor, the improvement comprising: said fluid condition responsive switch means including a flow-sensing valve including a valve body defining a valve bore; an inlet and an outlet port connected to the bore at axially spaced locations and respectively to the output of the main pump and to the steering valve; said electrically circuit means including an electrical conductive means extending through the valve body and including a valve seat located in the bore between the inlet and outlet; electrical insulating means surrounding the electrically conductive means for fixing the latter and insulating it from the valve body; a valve element axially shiftably mounted in the bore and having a seating surface located for engagement with said valve seat; axially yieldable means normally biasing said valve element to a closed position wherein the seating surface thereof engages said valve seat; and said yieldable means being responsive to a predetermined pressure at said inlet port to yield axially so as to allow the valve element to shift to an open position wherein the inlet and outlet ports are in fluid communication.

2. The vehicle defined in claim 1 wherein said electrically conductive means comprises a metal rod threaded into a metal, ring-like valve seat.

3. The vehicle defined in claim 2 wherein said electrical insulating means comprises first and second housing means bonded to said rod and to said valve seat.

4. The vehicle defined in claim 1 wherein said valve element is a poppet valve element having a closed end defining seating surface and being adjacent to a reduced-in-diameter portion of the valve element which cooperates with the valve bore to define an annular space; said valve element having a hollow interior; orifice means in said valve element connecting said annular space in fluid communication with said hollow interior; and said outlet port being located in fluid communication with said annular space.

5. The vehicle defined in claim 4 wherein said valve body includes a second inlet port spaced axially from said first-mentioned inlet port with said valve element being located therebetween; a one-way valve means located in the valve bore between said second inlet port and said outlet port for preventing flow in the direction of said second inlet port; said second inlet port being connected to the output of said auxiliary pump, whereby when said valve element is closed so as to complete a circuit to the electric motor for driving said auxiliary pump, fluid delivered by the auxiliary pump will unseat the one-way valve means and will act in conjunction with the yieldable means to maintain the valve element closed.

* * * * *